United States Patent
Miyamoto et al.

(10) Patent No.: US 9,651,971 B2
(45) Date of Patent: May 16, 2017

(54) CONTROL DEVICE, POWER CONTROL SYSTEM, AND POWER CONTROL METHOD

(75) Inventors: Masaaki Miyamoto, Tokyo (JP);
Tomonari Kusunose, Higashiomi (JP);
Nobuo Kuchiki, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 678 days.

(21) Appl. No.: 14/112,271

(22) PCT Filed: Apr. 16, 2012

(86) PCT No.: PCT/JP2012/060295
§ 371 (c)(1),
(2), (4) Date: Oct. 17, 2013

(87) PCT Pub. No.: WO2012/144474
PCT Pub. Date: Oct. 26, 2012

(65) Prior Publication Data
US 2014/0042811 A1 Feb. 13, 2014

(30) Foreign Application Priority Data
Apr. 18, 2011 (JP) .................. 2011-092522

(51) Int. Cl.
*G05F 1/66* (2006.01)
*H02J 3/38* (2006.01)
(Continued)

(52) U.S. Cl.
CPC .............. *G05F 1/66* (2013.01); *H02J 3/383* (2013.01); *H02J 7/35* (2013.01); *H02J 9/062* (2013.01);
(Continued)

(58) Field of Classification Search
CPC ... G01R 11/56; G05F 1/66; G06F 1/26; G06F 1/266; G06F 1/3203; G06F 1/3209;
(Continued)

(56) References Cited

U.S. PATENT DOCUMENTS 6,201,371 B1 * 3/2001 Kawabe .................. H02J 9/062
307/66
6,680,547 B1 * 1/2004 Dailey ...................... H02J 3/28
307/24

(Continued)

FOREIGN PATENT DOCUMENTS

CN 1273705 A 11/2000
CN 1498439 A 5/2004
(Continued)

OTHER PUBLICATIONS

International Search Report for PCT/JP2012/060295 mailed Jul. 10, 2012.
(Continued)

*Primary Examiner* — Thienvu Tran
*Assistant Examiner* — Brian K Baxter
(74) *Attorney, Agent, or Firm* — Procopio Cory Hargreaves and Savitch LLP

(57) ABSTRACT

An HEMS 700 provided in a consumer having independently operable power supply means (PV 100, storage battery 200, PCS 400 and the like) and at least one load 300, for controlling the power supply means and the load 300, determines an during-independent-operation schedule that is an operation schedule of the load during the independent operation on the basis of a period when the independent operation is performed, a power supply status of the power supply means, and a status of the load 300.

10 Claims, 6 Drawing Sheets

(51) Int. Cl.
*H02J 7/35* (2006.01)
*H02J 9/06* (2006.01)

(52) U.S. Cl.
CPC .............. *Y02B 10/72* (2013.01); *Y02E 10/563* (2013.01); *Y02E 10/566* (2013.01); *Y10T 307/25* (2015.04); *Y10T 307/406* (2015.04)

(58) Field of Classification Search
CPC .... G06F 1/3215; G06F 1/3287; G06F 1/3296; H01R 25/003; H02H 3/033; H02J 1/14; H02J 3/14; H02J 3/383; H02J 7/35; H02J 9/062; H02M 2001/009; H02M 3/33561; H04B 1/1615; H04W 52/02; H04W 52/0225; H04W 52/0229; H04W 52/028; Y02B 10/72; Y02B 60/1217; Y02B 60/1225; Y02B 60/1278; Y02B 60/1282; Y02B 60/1285; Y02B 70/3225; Y02E 10/563; Y02E 10/566; Y04S 20/222; Y10T 307/25; Y10T 307/406
USPC ................ 713/324, 300, 320, 323; 455/574
See application file for complete search history.

(56) References Cited

U.S. PATENT DOCUMENTS

| | | | | |
|---|---|---|---|---|
| 7,373,222 | B1* | 5/2008 | Wright | H02J 3/14 700/20 |
| 8,334,771 | B2 | 12/2012 | Matsuyama et al. | |
| 2004/0104709 | A1* | 6/2004 | Yamaji | G06F 1/203 320/150 |
| 2006/0028347 | A1* | 2/2006 | Ziejewski | H02J 3/14 340/635 |
| 2008/0217998 | A1* | 9/2008 | Parmley | H02J 1/10 307/65 |
| 2008/0263373 | A1* | 10/2008 | Meier | G06F 9/3017 713/300 |
| 2009/0063228 | A1* | 3/2009 | Forbes, Jr. | G01D 4/004 705/7.25 |
| 2009/0251002 | A1* | 10/2009 | Cohen | G06F 1/30 307/23 |
| 2010/0141442 | A1* | 6/2010 | Matsuyama | H04L 12/2825 340/541 |
| 2011/0022239 | A1* | 1/2011 | Forbes, Jr. | G06Q 10/00 700/286 |
| 2011/0022871 | A1* | 1/2011 | Bouvier | G06F 1/3206 713/340 |
| 2011/0172837 | A1* | 7/2011 | Forbes, Jr. | G06Q 10/00 700/291 |
| 2011/0196546 | A1* | 8/2011 | Muller | H02J 3/383 700/295 |
| 2011/0270452 | A1* | 11/2011 | Lu | G05B 19/042 700/291 |
| 2012/0101652 | A1* | 4/2012 | Shin | H02J 3/14 700/296 |
| 2012/0253532 | A1* | 10/2012 | McMullin | G06Q 50/06 700/291 |
| 2013/0123996 | A1* | 5/2013 | Matos | G06F 1/26 700/291 |
| 2013/0342358 | A1* | 12/2013 | Kardos | H02J 13/001 340/870.02 |
| 2014/0049053 | A1* | 2/2014 | Inoue | H02J 3/383 290/30 R |

FOREIGN PATENT DOCUMENTS

| | | |
|---|---|---|
| JP | 2003-092844 A | 3/2003 |
| JP | 2008252441 A | 10/2008 |
| JP | 2008289276 A | 11/2008 |
| JP | 2010233362 A | 10/2010 |
| WO | 2008/152798 A1 | 12/2008 |

OTHER PUBLICATIONS

Written Opinion for PCT/JP2012/060295 mailed Jul. 10, 2012.
The first Office Action issued by the Chinese Patent Office on Mar. 27, 2015, which corresponds to Chinese Patent Application No. 201280018766.1 and is related to U.S. Appl. No. 14/112,271 with English concise explanation.
The Extended European Search Report dated Sep. 29, 2014, which corresponds to European Application No. 12773709.6-1804 and is related to U.S. Appl. No. 14/112,271.
An Office Action; "Notice of Reasons for Rejection," issued by the Japanese Patent Office on Feb. 3, 2015, which corresponds to Japanese Patent Application No. 2011-092522 and is related to U.S. Appl. No. 14/112,271 with English concise explanation.

\* cited by examiner

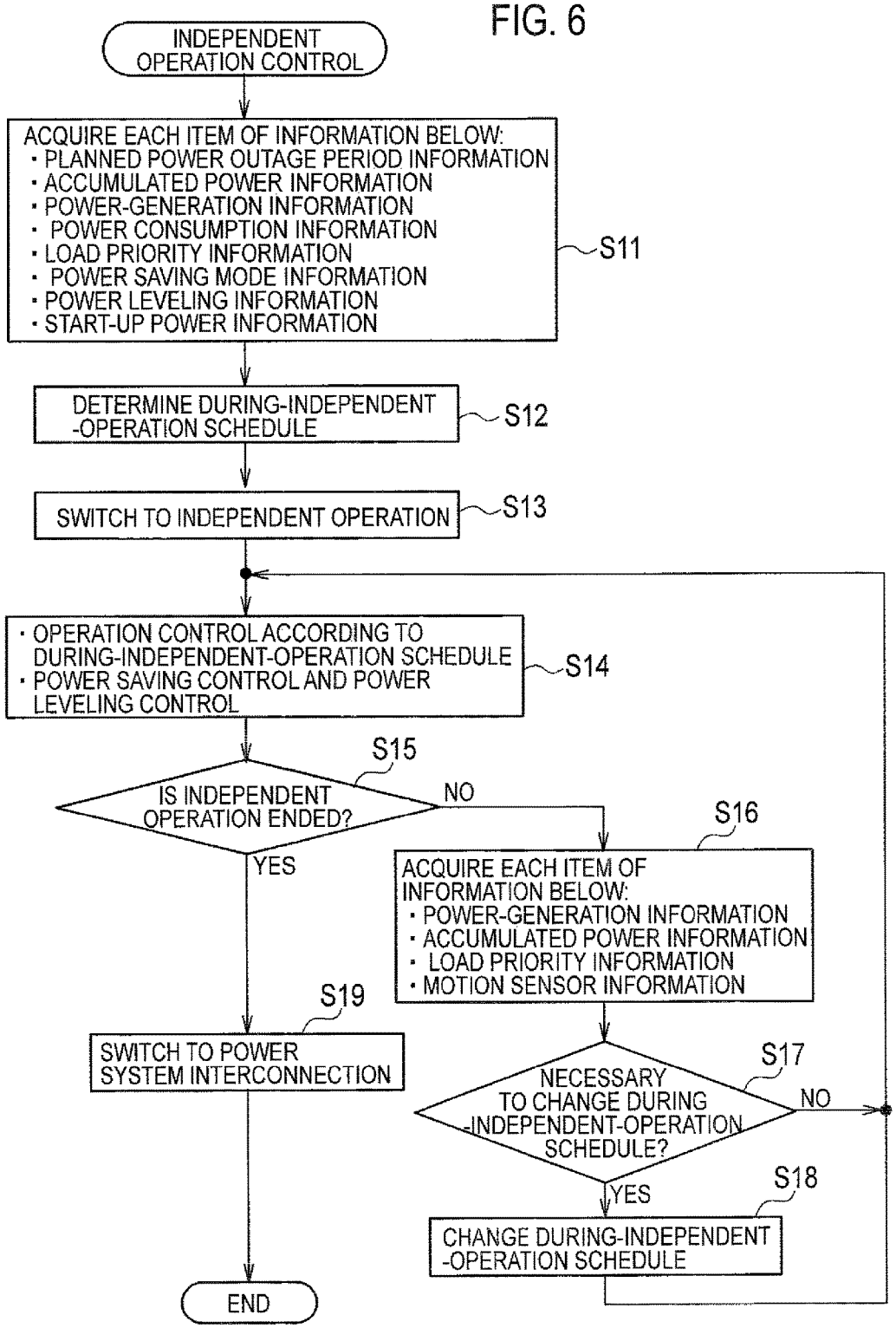

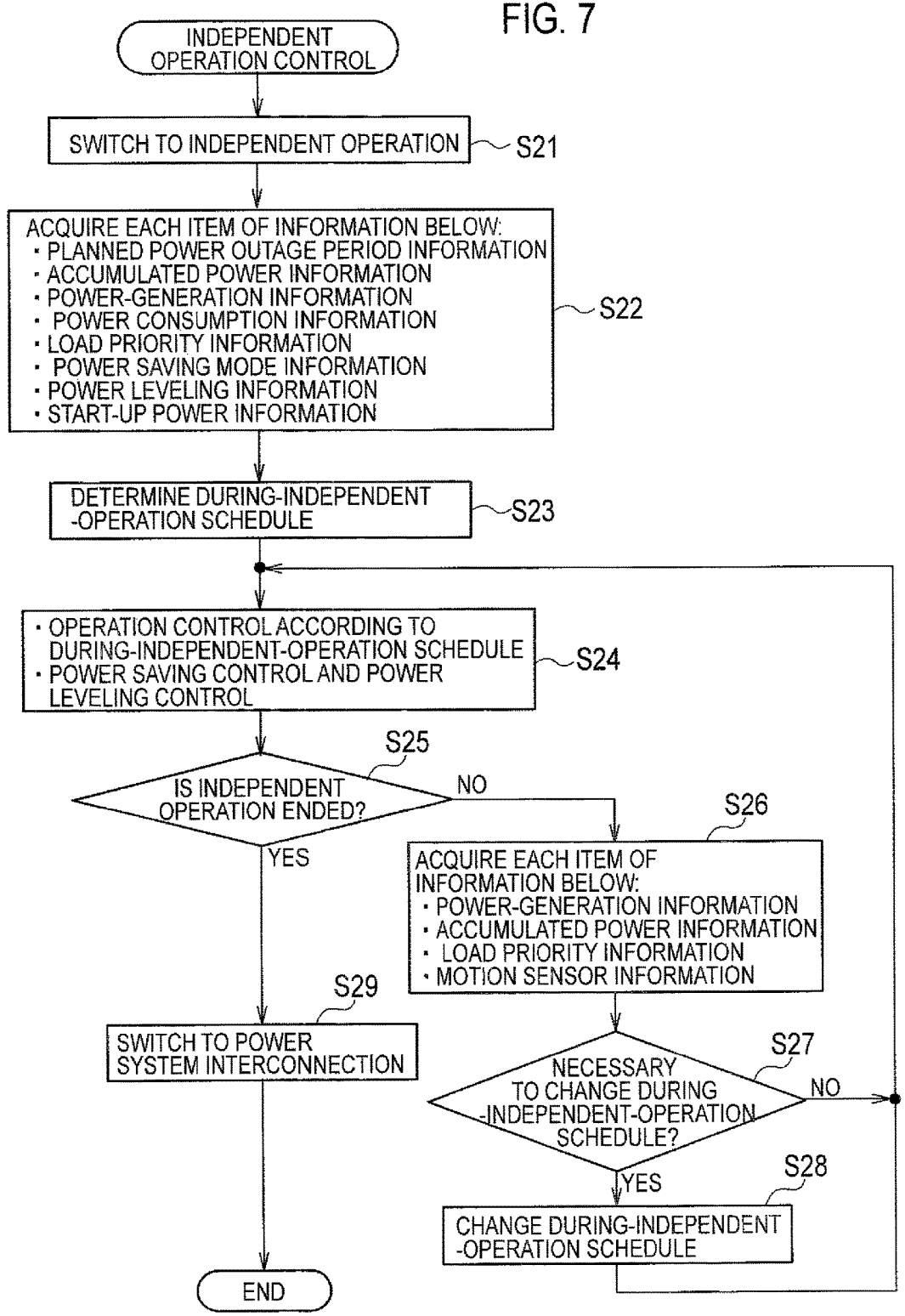

CONTROL DEVICE, POWER CONTROL SYSTEM, AND POWER CONTROL METHOD

TECHNICAL FIELD

The present invention relates to a control device provided in a consumer having independently operable power supply means and having at least one load, and controlling the power supply means and the load, a power control system therefore, and a power control method thereof.

BACKGROUND ART

A power conditioner provided in the consumer converts the power acquired by power generation of a power-generator such as a photovoltaic cell (PV) and/or a discharge of a storage battery to an alternating current, and outputs the alternating current to the load and a power system.

Most of such a power conditioner can perform an "independent operation" that supplies the power acquired by the power generation of the power-generator and/or the discharge of the storage battery to the load, without receiving any supply of the power from the power system. Through such an independent operation, also during the power outage, the power can be supplied to the load.

Also, recently, interests in the power saving have increased in view of the global environmental protection, and power management systems such as HEMS (Home Energy Management System) for performing the power management on a house basis, and BEMS (Building Energy Management System) for performing the power management on a building basis are attracting attention.

In such a power management system, a control device is provided in the consumer, which controls power supply means (such as a power-generator, a storage battery, and a power conditioner) and the load.

Also, in order to realize further power savings by using such a control device, introducing an automatic control technique that determines an operation schedule of the load and controls the load in accordance with the operation schedule is proposed (for example, see PTL 1).

CITATION LIST

Patent Literature

PTL 1: Japanese Patent Publication No. 2008-252441

SUMMARY OF THE INVENTION

Further, recently, a capacity of the power system to supply the power is reduced due to large-scale earthquakes, which results in a series of power outages. Also, in order to avoid the power outage of the entire power system, a system referred to as a "scheduled power outage (rotational power outage)" has been started, which performs the power outage according to the schedule, sequentially in every group (every area) of consumers.

However, because the conventionally proposed automatic control technique does not correspond to such a system, there is a problem that the operation schedule of the load during the power outage (that is, during the independent operation) cannot be determined appropriately.

Therefore, it is an object of the present invention to provide a control device, a power control system, and a power control method with which it is possible to appropriately determine an operation schedule of a load during an independent operation.

In order to solve the aforementioned problem, the present invention has following features.

The feature of a control device according to the present invention is summarized as follows. A control device (e.g., HEMS 700) provided in a consumer having independently operable power supply means (e.g., PV 100, storage battery 200, PCS 400, distribution board 500) and at least one load (load 300), for controlling the power supply means and the load, comprises: an operation schedule determination unit (operation schedule determination unit 712) that determines an during-independent-operation schedule that is an operation schedule of the load during the independent operation, wherein the operation schedule determination unit determines the during-independent-operation schedule, on the basis of a period when the independent operation is performed, a power supply status of the power supply means, and a status of the load.

In the aforementioned feature, the operation schedule determination unit determines the during-independent-operation schedule at a start time of the independent operation or during the independent operation.

In the aforementioned feature, the operation schedule determination unit determines the during-independent-operation schedule, on the basis of the period when the independent operation is performed, a power supply status of the power supply means before determining the during-independent-operation schedule, and a status of the load before determining the during-independent-operation schedule.

In the aforementioned feature, the control device further comprises: an acquisition unit (information acquisition unit 711) that acquires a setting of a power supply priority to the load, wherein the operation schedule determination unit determines the during-independent-operation schedule further on the basis of the setting.

In the aforementioned feature, the control device further comprises: a power saving control unit (power saving control unit 715A) that performs a power saving control for reducing power consumption of each load during the independent operation, wherein the operation schedule determination unit determines the during-independent-operation schedule further on the basis of the power saving control.

In the aforementioned feature, the control device further comprises: a power leveling control unit (power leveling control unit 715B) that performs a power leveling control for leveling out a total power consumption of the load during the independent operation, wherein the operation schedule determination unit determines the during-independent-operation schedule further on the basis of the power leveling control.

In the aforementioned feature, the control device further comprises: an operation schedule change unit (operation schedule change unit 714) that changes at least a part of the determined during-independent-operation schedule, on the basis of at least one of a power supply status of the power supply means during the independent operation, a status of the load during the independent operation, or a status of a user during the independent operation.

The feature of a power control system according to the present invention is summarized as follows. A power control system provided in a consumer having independently operable power supply means (e.g., PV 100, storage battery 200, PCS 400, distribution board 500) and at least one load (load 300), and having a control device (e.g., HEMS 700) for controlling the power supply means and the load, comprises: an operation schedule determination unit (operation schedule determination unit 712) that determines an during-independent-operation schedule that is an operation schedule of the load during the independent operation, wherein the operation schedule determination unit determines the during-independent-operation schedule, on the basis of a period when the independent operation is performed, a power supply status of the power supply means, and a status of the load.

The feature of a power control method according to the present invention is summarized as follows. A power control method comprises: a determination step of, by a control device provided in a consumer having independently operable power supply means and at least one load, for controlling the power supply means and the load, determining an during-independent-operation schedule that is an operation schedule of the load during an independent operation, wherein in the determination step, the during-independent-operation schedule is determined, on the basis of a period when the independent operation is performed, a power supply status of the power supply means, a status of the load.

BRIEF DESCRIPTION OF THE DRAWINGS

FIG. 6 is a flowchart of the independent operation control flow by the HEMS according to the embodiment of the present invention.

FIG. 7 is a flowchart of the independent operation control flow by the HEMS according to another embodiment.

DESCRIPTION OF THE EMBODIMENT

Figure 1:
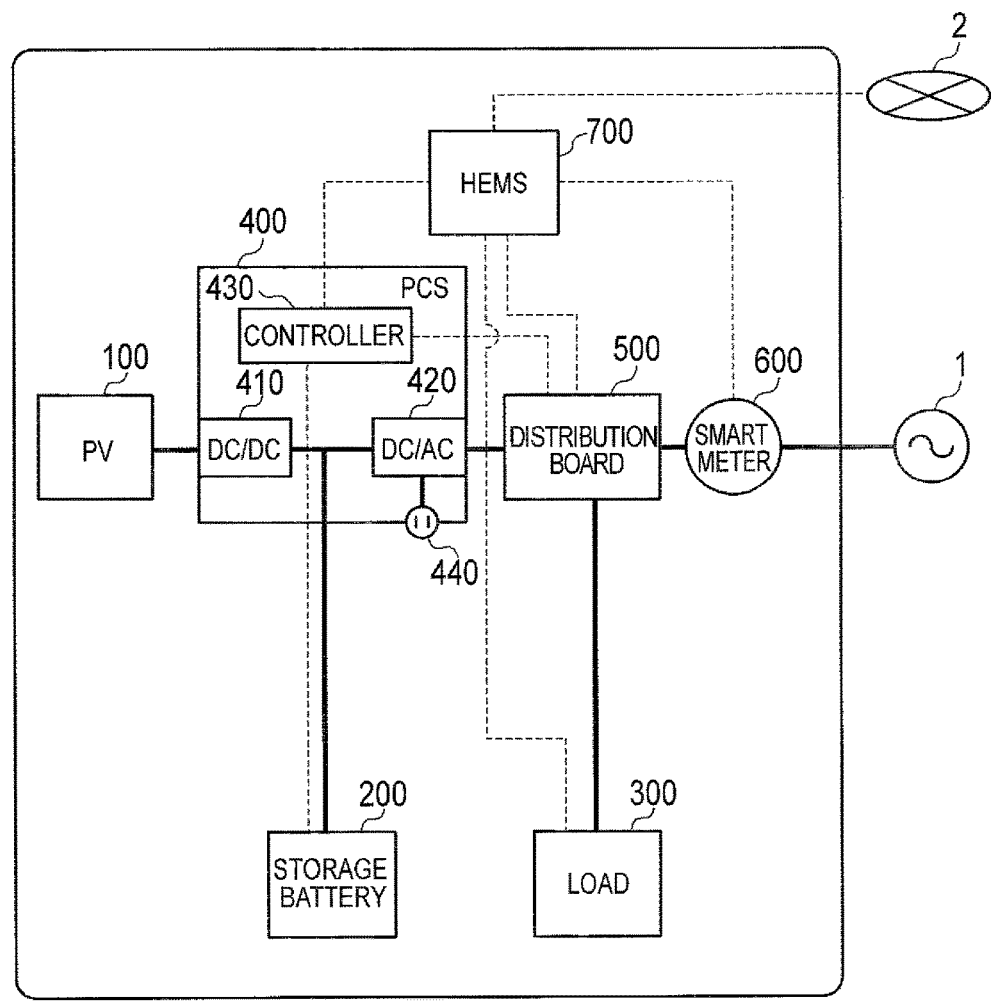
FIG. 1 is a diagram showing the entire configuration of a power control system according to the embodiment of the present invention.

With reference to the drawings, the embodiment of the present invention will be described. In the drawings of the embodiments, the same or similar reference signs are applied to the same or similar portions.

FIG. 1 is a diagram showing the entire configuration of a power control system according to the present embodiment. In the following figures, power lines are shown by thick lines, and control signal lines are shown by broken lines. Note that, the control signal line may not just be a wired line but a wireless line.

As shown in FIG. 1, the power control system according to the present embodiment is provided with a photovoltaic cell (PV) 100, a storage battery 200, a gas power-generator 220, a power conditioner (PCS) 400, a distribution board 500, a smart meter 600, and HEMS 700, in the consumer which receives the supply of AC power from a power system 1 of an electric power company.

The PV 100 receives sunlight to generate power and outputs DC power acquired by the power generation (hereinafter, PV generated power) to the PCS 400 via the power line provided between the PCS 400 and the PV 100. Note that, the PV 100 is configured by one panel or a plurality of panels. Also, the PV 100 may be configured by using a plurality of strings configured by a plurality of panels.

The storage battery 200 stores the power, and outputs the DC power acquired by a power discharge (hereinafter, storage battery discharge power) to the PCS 400 and is charged with the DC power from the PCS 400, via the power line provided between the PCS 400 and the storage battery 200. Also, via the control signal line provided between the PCS 400 and the storage battery 200, the storage battery 200 outputs information indicating the accumulated power to the PCS 400, and a control signal for charging or discharging is inputted to the storage battery 200.

The AC power is supplied to a load 300 via the power line provided between the distribution board 500 and the load 300, and the load 300 consumes the supplied AC power for operation. The load 300 may be one or plural. In the load 300, not just household electrical appliances such as lighting, an air conditioner and a refrigerator, and television, but a heat accumulator and the like can be included. Also, the load 300 is configured to be able to communicate with the HEMS 700, and configured to switch to a power saving mode in response to a control command from the HEMS 700.

The PCS 400 has a function of converting the DC power acquired by the power generation of the PV 100 and the power discharge of the storage battery 200 to the AC and outputting the AC, and a function of converting the AC power from the power system 1 to the DC and outputting the DC. Such PCS 400 can be referred to as a hybrid PCS. The PCS 400 performs input and output of the AC power between the distribution board 500, via the power line provided between the distribution board 500 and the PCS 400. Also, the PCS 400 outputs the DC power for charging the storage battery 200 to the storage battery 200, via the power line provided between the storage battery 200 and the PCS 400.

The PCS 400 has a DC/DC converter 410, a DC/AC converter 420, a controller 430, and a socket 440 for the independent operation. However, the PCS 400 may not have the socket 440 for the independent operation.

The DC/DC converter 410 performs DC/DC conversion on the DC power acquired by the power generation of the PV 100, and under control of the controller 430, outputs the DC power to the storage battery 200 and/or the DC/AC converter 420.

The DC/AC converter 420 converts the DC power that the DC/DC converter 410 outputs, and/or the storage battery discharge power to the AC and outputs these powers to the distribution board 500, under the control of the controller 430. Also, when the load is connected to the socket 440 for the independent operation, the DC/AC converter 420 outputs the AC power to the socket 440 for the independent operation under the control of the controller 430. Further, the DC/AC converter 420 converts the AC power inputted from the distribution board 500 to DC and outputs the DC to the storage battery 200, under the control of the controller 430.

The controller 430 controls various types of functions of the PCS 400, and is configured by using a CPU or a memory. Also, the controller 430 transmits and receives various types of control signals to and from the HEMS 700. Specifically, the controller 430 acquires a measurement value of the DC power acquired by the power generation of the PV 100 (hereinafter, a generated power), a measurement value of the gas generated power, a measurement value of the power that the storage battery 200 stores (hereinafter, an accumulated power), and a measurement value of the power that the socket 440 for the independent operation supplies, and notifies the HEMS 700 of these measurement values. Also, the controller 430 controls the charging and discharging of the storage battery 200 and adjusts the PV generated power, in accordance with the control command received from the HEMS 700. Note that, a user interface unit which receives an input from a user may be connected to the controller 430.

The socket 440 for the independent operation supplies the power to the load during the independent operation. However, the socket 440 for the independent operation is provided not just at the PCS 400, but sometimes provided apart from the PCS 400 via the power line.

The distribution board 500 distributes the power under the control of the controller 430 of the PCS 400 and/or HEMS 700. When the AC power that the PCS 400 outputs is less than power consumption of the load 300, the distribution board 500 receives a shortfall of the AC power from the power system 1, and supplies the load 300 with the AC power that the PCS 400 outputs and the AC power received from the power system 1. Also, if the AC power that the PCS 400 outputs exceeds the power consumption of the load 300, the distribution board 500 transmits (sells) an excess of the AC power to the power system 1.

Note that, an operation state that supplies the load 300 with both powers of the power from the PCS 400 and the power from the power system 1 is referred to as a "linkage operation", and an operation state that supplies the load 300 with only the power from the PCS 400 is referred to as an "independent operation." During the power outage of the power system 1 (hereinafter merely referred to as a "power outage"), the distribution board 500 performs a parallel-off from the power system 1, and switches from the linkage operation to the independent operation.

Note that, for a switching from the linkage operation to the independent operation, there are a method for replugging the load 300 in the socket 440 for the independent operation, and a method that the distribution board 500 performs an automatic switching. In the following, a case where the distribution board 500 performs the automatic switching is mainly described.

During the independent operation, to the load 300, the generated power from the PV 100 and the discharge power from the storage battery 200 are supplied via the PCS 400 and the distribution board 500. Namely, in the present embodiment, the PV 100, the storage battery 200, the PCS 400, and the distribution board 500 configure power supply means that supply the load 300 with the power.

The smart meter 600 is provided on the power line between the power system 1 and the distribution board 500, measures selling and buying electric power that are inputted and outputted to and from the power system 1, and notifies the HEMS 700 of the measurement values. Also, the smart meter 600 communicates with an external network 2, transmits the measurement values of the selling and buying electric power to the external network 2, and receives power rate information and the like.

The HEMS 700 is the one for performing power management within the consumer, and has a function of controlling each device within the consumer by transmitting various types of control commands to the PCS 400 and the distribution board 500, and a function of collecting various types of measurement values and monitoring and displaying a state of the each device within the consumer. Also, the HEMS 700 determines an operation schedule of the load 300, and performs a control according to the determined operation schedule. In the present embodiment, the HEMS 700 corresponds to the control device that controls the power supply means (the PV 100, the storage battery 200, the PCS 400 and the like) and the load 300. Note that, the HEMS 700 may acquire information for use in the control from the external network 2 by communicating with the external network 2.

Figure 2:
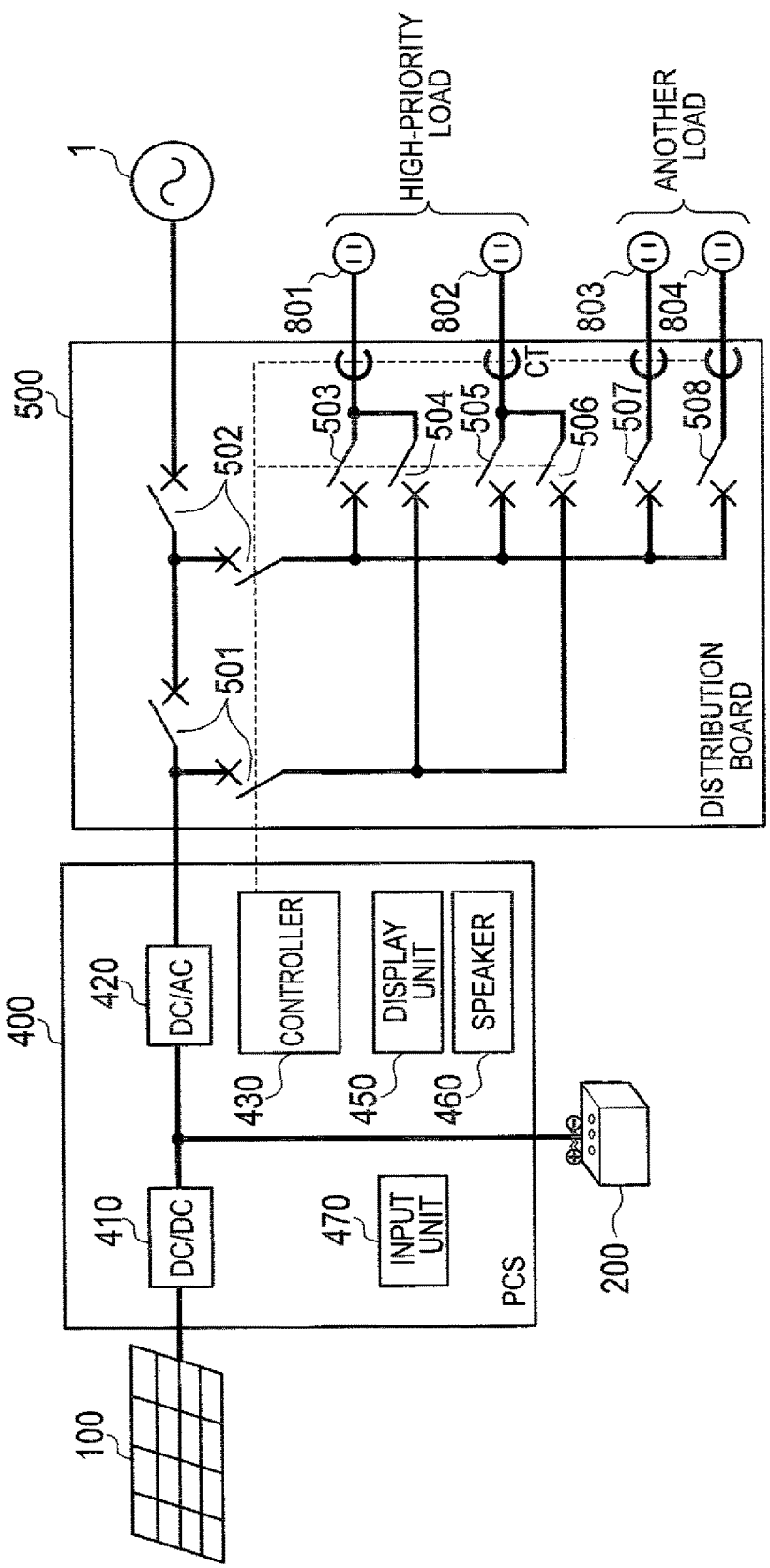
FIG. 2 is a diagram showing a detailed configuration example 1 of the PCS and the distribution board according to the embodiment of the present invention.

Next, a detailed configuration of the PCS 400 and the distribution board 500 is described. FIG. 2 is a diagram showing a detailed configuration example 1 of the PCS 400 and the distribution board 500.

As shown in FIG. 2, the PCS 400 according to the present configuration example has a display unit 450 and a speaker 460 in addition to the DC/DC converter 410, the DC/AC converter 420, and the controller 430. In case of the power outage, the display unit 450 performs a display that it is during the power outage, under the control of the controller 430. Also, in case of the power outage, the speaker 460 performs an audio output that it is during the power outage, under the control of the controller 430. Further, an input unit 470 may be provided, which is capable of inputting a planned power outage period and designating a load priority and the like described below.

Also, the distribution board 500 according to the present configuration example has a function of performing a parallel-off from the power system 1, and a function of switching between supplying power and not supplying power for each of sockets 801 to 804 during the independent operation. Specifically, the distribution board 500 has a service breaker 501, a master breaker 502, power switches 503 to 508, and a power consumption sensor CT.

The service breaker 501, the master breaker 502, and the power switches 503 to 508 turn on or off under the control of the controller 430 of the PCS 400. The power sensor CT measures the power that the loads (for example, lighting and a refrigerator) connected to the sockets 801 to 804 consume, and notifies the controller 430 of the measurement values.

When the power has been acquired from the power system 1, the controller 430 turns each of the service breaker 501 and master breaker 502 to the on-state, for example, in response to the control command from the HEMS 700. By this, the power becomes capable of being supplied to the loads connected to the sockets 801 to 804.

On the contrary, when switching to the independent operation due to the power outage, the controller 430 turns the master breaker 502 to the off-state (parallel off) as the controller 430 keeps the service breaker 501 in the on-state, for example, in response to the control command from the HEMS 700. By this, although the AC power that the PCS 400 outputs becomes capable of being supplied to the loads connected to the sockets 801 and 802, the power becomes incapable of being supplied to the loads connected to the sockets 803 and 804.

Therefore, by connecting high-priority loads to the sockets 801 and 802, during the independent operation, the power can be supplied to these high-priority loads.

Figure 3:
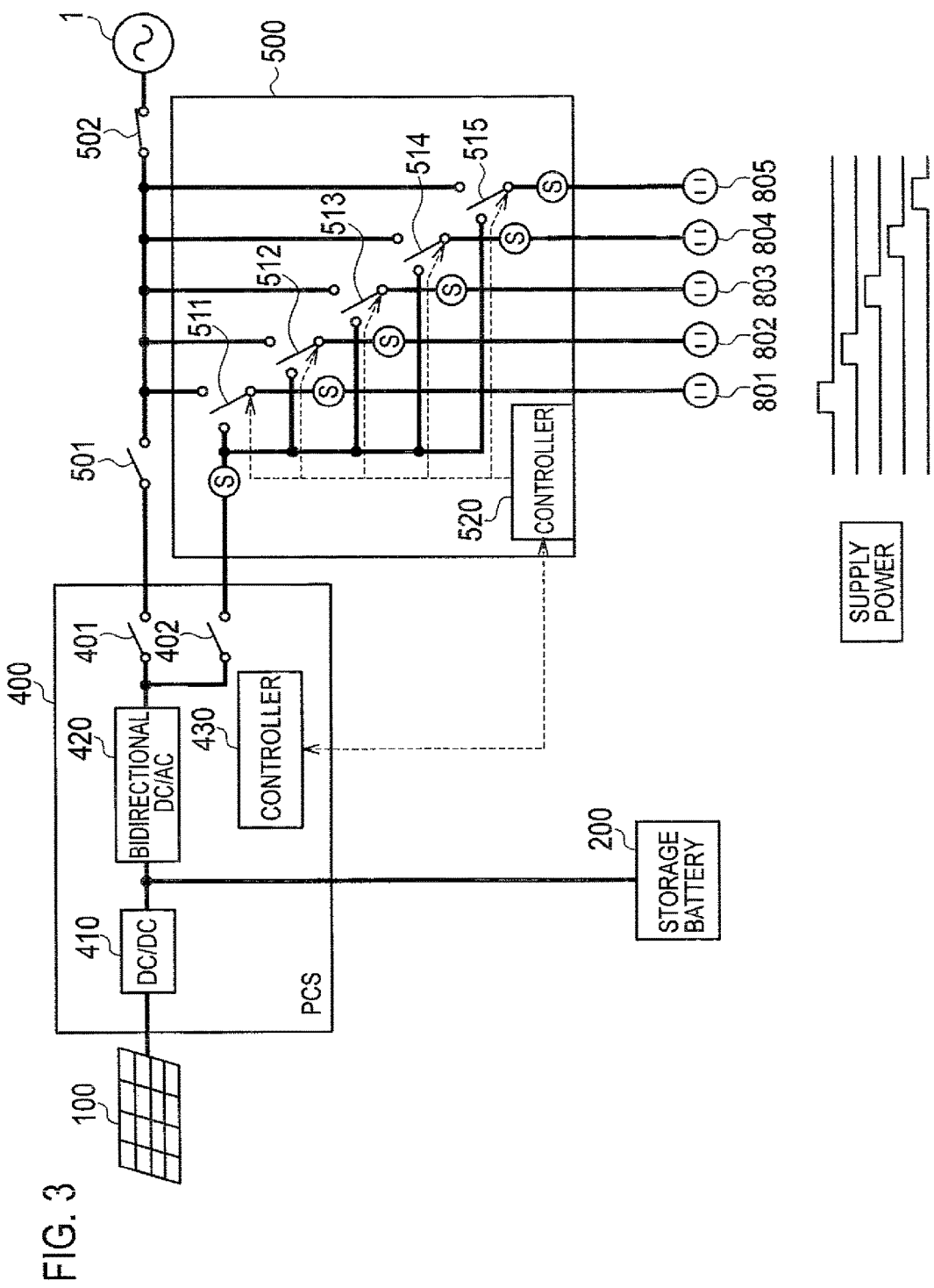
FIG. 3 is a diagram showing a detailed configuration example 2 of the PCS and the distribution board according to the embodiment of the present invention.

FIG. 3 is a diagram showing a detailed configuration example 2 of the PCS 400 and the distribution board 500.

As shown in FIG. 3, the PCS 400 according to the present configuration example is similar to the configuration example 1 in terms of having the DC/DC converter 410, the bidirectional DC/AC converter 420, and the controller 430, but differs from the configuration example 1 in terms of having power switches 401 and 402. Also, the distribution board 500 according to the present configuration example is similar to the configuration example 1 in terms of having the service breaker 501 and the master breaker 502, but differs from the configuration example 1 in terms of having a controller 520, and power switches 511 to 515 provided in each of the sockets 801 to 805. Further, in the present configuration example, a power consumption sensor S is provided in each of the sockets 801 to 805, and the controller 520 collects each measurement value and notifies the controller 430 of the PCS 400 of the values. Note that, in FIG. 3, the signal lines connecting the controller 520 and the power consumption sensors S are omitted.

When the power has been acquired from the power system 1, the controller 430 turns each of the power switch 401, the service breaker 501, and the master breaker 502 to the on-state, for example, in response to the control command from the HEMS 700, controls the power switch 402 to be turned to the off-state, and controls to switch each of the power switches 511 to 515 to the power system 1 side. By this, the power becomes capable of being supplied to the loads connected to the sockets 801 to 805.

On the contrary, when switching to the independent operation due to the power outage, the controller 430 turns the power switch 401, the service breaker 501, and the master breaker 502 to the off-state, for example, in response to the control command from the HEMS 700, and controls the power switch 402 to be turned to the on-state. By having the power switches 401 and 402 within the PCS 400 as in the present embodiment, the power control for the loads during the independent operation can be performed within the PCS 400.

Also, the controller 520 controls to sequentially (cyclically) switch the power switches 511 to 515 to the on-state as shown in the lower part of FIG. 3, for example, in response to an instruction from the controller 430. That is, the controller performs control such that time for which the power is capable to be supplied is assigned sequentially (cyclically) to the sockets 801 to 805. By this, because supplying the power to more than two loads at the same time is prevented, the power consumption in a plurality of loads connected to each of the sockets 801 to 805 can be dispersed in time (leveled out). In the following, such a control is referred to as a "power leveling control". Note that, the assigned time intervals may be from a few minutes to several tens of minutes, and the power may be supplied continuously to the load that requires continuing power supply.

Figure 4:
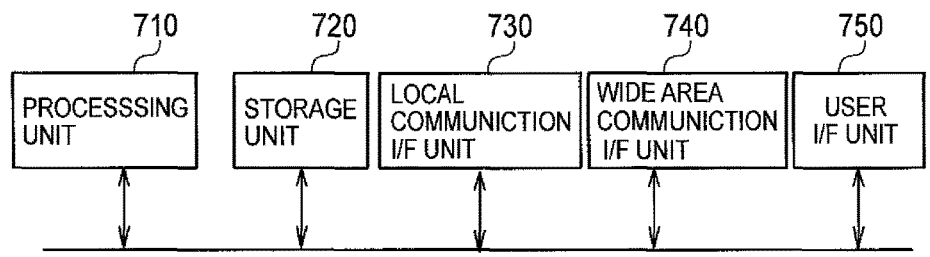
FIG. 4 is a configuration diagram of the HEMS according to the embodiment of the present invention.

Next, a detailed configuration of the HEMS 700 is described. FIG. 4 is a configuration diagram of the HEMS 700.

As shown in FIG. 4, the HEMS 700 has a processing unit 710, a storage unit 720, a local communication I/F unit 730, a wide area communication I/F unit 740, and a user I/F unit 750. The processing unit 710, the storage unit 720, the local communication I/F unit 730, the wide area communication I/F unit 740, and the user I/F unit 750 exchange information via a bus line or a LAN.

The processing unit 710 is configured by, for example, a CPU, and controls various types of functions of the HEMS 700 by executing a control program stored in the storage unit 720. Also, the processing unit 710 performs an independent operation control described below. A functional block configuration of the processing unit 710 will be described below.

The storage unit 720 is configured by, for example, an RAM or a nonvolatile memory, and stores each type of information to be used in the control, for example, of the HEMS 700.

The local communication I/F unit 730 is a communication I/F for communicating with each device within the consumer. The local communication I/F unit 730 communicates via Zigbee (registered trademark) or Ethernet (registered trademark), for example.

The wide area communication I/F unit 740 is a communication I/F for communicating with the external network 2.

The user I/F unit 750 is configured by including an input unit that receives an input from the user, and a display unit that performs various types of displays.

Figure 5:
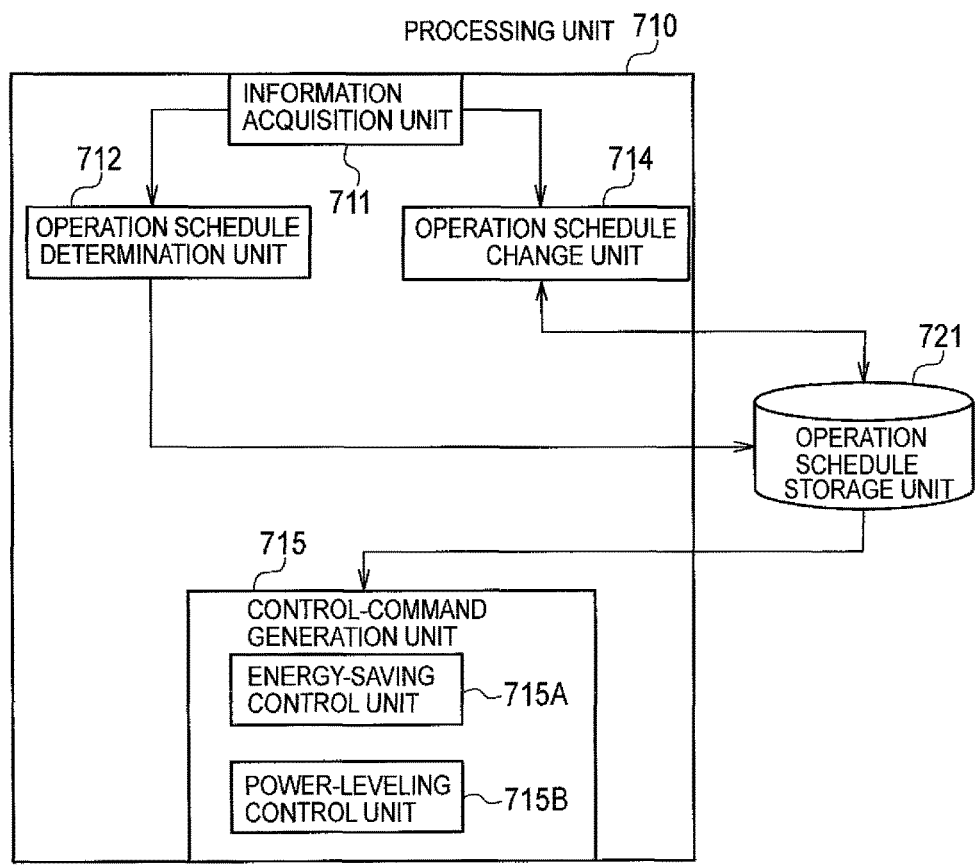
FIG. 5 is the functional block diagram of the processing unit according to the embodiment of the present invention.

FIG. 5 is the functional block diagram of the processing unit 710.

As shown in FIG. 5, the processing unit 710 has control-command generation unit 715 an information acquisition unit 711, an operation schedule determination unit 712, and an operation schedule change unit 714, and a control-command generation unit 715.

The information acquisition unit 711 acquires various type of information (details are described below) for determining a during-independent-operation schedule which is an operation schedule of the load 300 during the independent operation, via the local communication I/F unit 730 and/or the wide area communication I/F unit 740.

The operation schedule determination unit 712 determines the during-independent-operation schedule on the basis of the information acquired by the information acquisition unit 711. The operation schedule determination unit 712 stores the information of the determined during-independent-operation schedule into an operation schedule storage unit 721 provided in the storage unit 720.

The operation schedule change unit 714 changes the during-independent-operation schedule stored in the operation schedule storage unit 721, on the basis of information newly acquired by the information acquisition unit 711, and updates the operation schedule before the change by an operation schedule after the change.

The control-command generation unit 715 generates the control command in accordance with the operation schedule stored in the operation schedule storage unit 721, and transmits the generated control command via the local communication I/F unit 730 to the target apparatus within the consumer.

In addition, the control-command generation unit 715 has a power saving control unit 715A, and a power leveling control unit 715B.

The power saving control unit 715A generates, at an independent operation start time, a power saving control command for instructing "power saving control" which causes the load 300 to operate in a power saving mode, and transmits the generated power saving control command via the local communication I/F unit 730 to the load 300.

The power leveling control unit 715B generates, at the independent operation start time, a power leveling control command for instructing the above-described power leveling control, and transmits the generated power leveling control command via the local communication I/F unit 730 to the distribution board 500.

Next, the independent operation control flow by the HEMS 700 is described. FIG. 6 is a flowchart of the independent operation control flow by the HEMS 700. This flow is triggered by detection of the power outage or switching to the independent operation by the user.

As shown in FIG. 6, in step S11, the information acquisition unit 711 acquires planned power outage period information, accumulated power information, power-generation information, and power consumption information.

The planned power outage period information is information indicating the planned power outage period defined by scheduled power outages (rotational power outages), and includes, for example, a date corresponding to the planned power outage period, a start time of the planned power outage period, and an end time of the planned power outage period. The information acquisition unit 711 acquires the planned power outage period information via the wide area communication I/F unit 740 from the external network 2, or acquires the planned power outage period information on the basis of a user input to the user I/F unit 750. Alternatively, when the user I/F unit (for example, the input unit 470 shown in FIG. 2) is provided in the PCS 400, the planned power outage period information may be acquired on the basis of the user input to the user I/F unit 750 of the PCS 400. When the smart meter 600 can acquire the planned power outage period information from the external network 2, the planned power outage period information may be acquired via the local communication I/F unit 730 from the smart meter 600.

In the present embodiment, the planned power outage period indicated by the above described planned power outage period information corresponds to a period when the independent operation is performed.

The accumulated power information is information indicating the accumulated power of the storage battery 200 before the power outage (just before the power outage). The information acquisition unit 711 acquires the accumulated power information via the local communication I/F unit 730 from the PCS 400.

The power-generation information is information indicating the generated power of the PV 100 before the power outage (immediately before the power outage). The information acquisition unit 711 acquires the power-generation information via the local communication I/F unit 730 from the PCS 400. Alternatively, the information acquisition unit 711 acquires generated power indicating estimated generated-power of the PV 100 during the independent operation, on the basis of information useful for acquiring the estimated generated-power of the PV 100 in the future (during the independent operation). Here, the information useful for acquiring the estimated generated-power is, for example, the following information.

Weather forecast and meteorological sensor: From this information, for example, an amount of solar radiation that influences the power generation of the PV 100 can be estimated, and future generated power can be predicted. The information acquisition unit 711 acquires the weather forecast information and the meteorological sensor information via the wide area communication I/F unit 740 from the external network 2.

A clock or calendar function: From this information, for example, an amount of solar radiation that influences the power generation of the PV 100 can be estimated, and the future generated power can be predicted. The information acquisition unit 711 acquires information of the day's date and the current time from an internal timer of the HEMS 700, or from the external network 2 via the wide area communication I/F unit 740.

Presumption from a power generation amount at the power outage start time: For example, in response to whether the generated power at the power outage start time (at the time of switching to the independent operation) has a tendency to increase or decrease, the future generated power can be predicted.

Past power-generation actual performance data: For example, by storing the generated power for each environmental condition in the storage unit 720, and searching the past generated power corresponding to the current environmental condition, the future generated power can be predicted.

In the present embodiment, the above described accumulated power information and power-generation information correspond to a power supply status of the power supply means.

The power consumption information is information indicating total power consumption of the load 300 before the power outage (immediately before the power outage). The total power consumption of the load 300 can be measured by, for example, the distribution board 500, or the socket to which the load 300 is connected, and the information acquisition unit 711 acquires the power consumption information via the local communication I/F unit 730. Alternatively, as shown in FIG. 2, when the load that should be supplied with the power during the independent operation is limited, it is only necessary to acquire power consumption information about the load. Also, when the load is connected to the socket 440 for the independent operation and the independent operation is performed, information of the load may be acquired manually or automatically, and the power consumption information about the load may be acquired from the acquired information.

Basically, by using the above described planned power outage period information, accumulated power information, power-generation information, and power consumption information, the during-independent-operation schedule can be determined. For example, with the total power capable of being supplied to the load 300 during the power outage (during the independent operation), it is decided how much power as compared to the total power consumption of the load 300 can be supplied, and a schedule that decides a timing in the planned power outage period (independent operation period) at which the power is supplied to the load 300.

Further, the information acquisition unit 711 can determine the during-independent-operation schedule more suitably, by acquiring load priority information, power saving mode information, power leveling information, and start-up power information.

The load priority information is information about a setting of a priority of power supply to the load 300. The information acquisition unit 711 acquires the load priority information on the basis of the user input to the user I/F unit 750. Alternatively, the load priority information about a predetermined priority may be stored in the storage unit 720, and the load priority information may be acquired from the storage unit 720. For example, in the predetermined priority when a gas power-generator is provided in the consumer, the gas power-generator is set to the second highest priority and the HEMS 700 and an emergency light are set to the high priority.

The power saving mode information is information indicating information of the power saving mode of each load 300 (for example, types of the power saving mode and the power consumption at the power saving mode).

The power leveling information is information regarding the power leveling control as shown in FIG. 3 (for example, information of the load 300 that should be subject to the power leveling control).

The start-up power information is information indicating the start-up power of each load 300. For example, after the refrigerator performs an intermittent operation and the like as the power saving mode during the power outage, the temperature of the refrigerator is increased. When the electricity is restored, a large amount of start-up power is required for cooling back again to the original temperature. In this case, the continuous operation for a long time is considered to consume less power. Thus, it is preferable to determine the schedule in the light of the start-up power information (if acquirable, also such as an internal temperature of the refrigerator).

In step S12, the operation schedule determination unit 712 determines the during-independent-operation schedule on the basis of the planned power outage period information, the accumulated power information, the power-generation information, the power consumption information, the load priority information, the power saving mode information, the power leveling information, and the start-up power information that are acquired by the information acquisition unit 711. For example, by the total power capable of being supplied to the load 300 during the power outage (during the independent operation), it is decided how much power as compared to the load total power consumption can be supplied, taking into account the power saving control and the power leveling control, and also in light of the priority and the start-up power of the load 300, and the schedule that decides a timing in the planned power outage period (independent operation period) at which the power is supplied and the loads to the power is supplied.

As a concrete example, after inputting the planned power outage period as two hours, the independent operation schedule of the load to be determined on the basis of the accumulated power information and the power-generation information is shown in Table 1. In this manner, the schedule may be made such that a load power consumption amount does not exceed the power-generation amounts of the storage battery and the photovoltaic cell.

Note that, when performing the switching every thirty minutes, the "power leveling control" described in FIG. 3 may be performed.

distribution board 500. Alternatively, the distribution board 500 may automatically perform the switching to the independent operation, and the user may manually perform the switching to the independent operation by connecting the load 300 to the socket 440 for the independent operation.

In step S14, the control-command generation unit 715 transmits the control command according to the during-independent-operation schedule information stored in the operation schedule storage unit 721, via the local communication I/F unit 730, to the load 300, the PCS 400, and the distribution board 500.

When the independent operation is terminated due to the lapse of the planned power outage period, the operation is switched to the power system interconnection (step S19), and the present flow is terminated. On the contrary, when the independent operation is continued (step S15; NO), in step S16, the information acquisition unit 711 acquires again the accumulated power information, the power-generation information, and the load priority information. Acquiring again the accumulated power information and the power-generation information is for changing the during-independent-operation schedule, if there is an error in the current accumulated power and the current generated power as compared to an initial expectation. Acquiring again the load priority information is for allowing an interrupt of the load that is not scheduled, such as a case where a charge of a cellular phone is required. Also the information acquisition unit 711 may acquire motion sensor information when a motion sensor is provided within the consumer. For

TABLE 1

| <POWER OUTAGE PERIOD> | | | |
|---|---|---|---|
| 2 HOURS | | | |
| <POWER SUPPLY> | | | |
| | SUPPLY DEVICE | SUPPLY POWER | CONTINUED TIME |
| | PHOTOVOLTAIC CELL | 300 W | 1 HOUR (ESTIMATED) |
| | BATTERY | 700 W | 2 HOUR AVAILABLE |
| <POWER CONSUMPTION> | | | |
| PRIORITY | LOAD NAME | POWER CONSUMPTION DURING NORMAL TIME | POWER CONSUMPTION DURING POWER SAVING MODE | OPERATION TIME (FROM START TIME) |
| 1 | POWER CONTROL SYSTEM (E.G., HEMS) | 100 W | 100 W | 0 to 2.0 HOURS |
| 2 | GAS POWER GENERATOR | 300 W | 300 W | 0 to 0.5 HOURS |
| 3 | LIGHTING | 800 W | 100 W (EMERGENCY LIGHT TAKES PRIORITY) | 0 to 2.0 HOURS |
| 4 | REFRIGERATOR | 1 KW | 400 W | 0 to 0.5 HOURS 1.0 to 1.5 HOURS |
| 5 | AIR CONDITIONER | 2 KW (COOLING, 25° C.) | 500 W (DEHUMIDIFICATION, 28° C.) | 0.5 to 1.0 HOURS 1.5 to 2.0 HOURS |
| 6 | TELEVISION | 300 W | 200 W | 0.5 to 1.0 HOURS |
| 7 | HEAT ACCUMULATOR | 3 KW | — | — |

The operation schedule storage unit 721 stores the during-independent-operation schedule determined by the operation schedule storage unit 721.

In step S13, the control-command generation unit 715 generates a switching command to the independent operation, and transmits the generated switching command via the local communication I/F unit 730 to the PCS 400 and the example, it can be thought that the motion sensor is provided in every room, and the operation schedule of the lighting and the air conditioner and the like is changed in response to whether the user is in the room or not.

As a concrete example, when one hour has passed since the operation started according to the independent operation schedule in Table 1, the changed independent operation schedule when the power-generation information is acquired again and the cellular phone is charged hastily, is shown in Table 2.

TABLE 2

<POWER SUPPLY>

| SUPPLY DEVICE | SUPPLY POWER | CONTINUED TIME |
|---|---|---|
| PHOTOVOLTAIC CELL | 100 W | 1.0 HOUR |
| BATTERY | 700 W | 1.0 HOUR AVAILABLE |

<POWER CONSUMPTION>

| PRIORITY | LOAD NAME | POWER CONSUMPTION DURING NORMAL TIME | POWER CONSUMPTION DURING POWER SAVING MODE | OPERATION TIME (FROM START TIME) |
|---|---|---|---|---|
| 1 | POWER CONTROL SYSTEM (E.G., HEMS) | 100 W | 100 W | 1 to 2.0 HOURS |
| 2 | GAS POWER GENERATOR | 300 W | 300 W | — |
| 3 | LIGHTING | 800 W | 100 W (EMERGENCY LIGHT TAKES PRIORITY) | 1 to 2.0 HOURS |
| 4 | REFRIGERATOR | 1 KW | 400 W | 1.0 to 1.5 HOURS |
| 5 | CELLULAR PHONE | | 50 W | 1.0 to 1.5 HOURS |
| 5 ⇒ 6 | AIR CONDITIONER | 2 KW (COOLING, 25° C.) | 500 W (DEHUMIDIFICATION, 28° C.) | 1.5 to 2.0 HOURS |
| 6 ⇒ 7 | TELEVISION | 300 W | 200 W | — |
| 7 ⇒ 8 | HEAT ACCUMULATOR | 3 KW | — | — |

In step S17, the operation schedule change unit 714 decides, on the basis of the accumulated power information, the power-generation information, the load priority information, and the motion sensor information acquired by the information acquisition unit 711, whether the operation schedule change unit 714 changes the during-independent-operation schedule stored in the operation schedule storage unit 721 or not.

When the operation schedule change unit 714 decides not to change the during-independent-operation schedule (step S17; NO), the processing is returned to step S14.

When the operation schedule change unit 714 decides to change the during-independent-operation schedule (step S17; YES), in step S18, the operation schedule change unit 714 changes the during-independent-operation schedule stored in the operation schedule storage unit 721, and the processing is subsequently returned to step S14.

As described above, the operation schedule determination unit 712 can appropriately determine the operation schedule of the load 300 during the power outage (that is, during the independent operation), by determining the during-independent-operation schedule, on the basis of the period when the independent operation is performed, the power supply status of the power-generator and the storage battery 200, and a status of the load 300.

In the present embodiment, the operation schedule determination unit 712 can determine the operation schedule of the load 300 during the power outage (that is, during the independent operation) at a suitable timing, by determining the during-independent-operation schedule, at the independent operation start time.

Further, in the present embodiment, the operation schedule determination unit 712 can determine the during-independent-operation schedule according to the most recent status, by determining the during-independent-operation schedule, on the basis of the period when the independent operation is performed, the power supply status of the power-generator and the storage battery 200 before determining the during-independent-operation schedule, and the status of the load 300 before determining the during-independent-operation schedule.

In the present embodiment, the operation schedule determination unit 712 can supply the power to the load 300 at an appropriate priority, by determining the during-independent-operation schedule further on the basis of the setting of the power supply priority to the load 300.

In the present embodiment, the operation schedule determination unit 712 can appropriately determine the during-independent-operation schedule in view of the power saving control during the independent operation, by determining the during-independent-operation schedule further on the basis of the power saving control.

In the present embodiment, the operation schedule determination unit 712 can appropriately determine the during-independent-operation schedule in view of the power leveling control during the independent operation, by determining the during-independent-operation schedule further on the basis of the power leveling control.

In the present embodiment, the operation schedule change unit 714 can appropriately change the during-independent-operation schedule during the independent operation, by changing at least a part of the determined during-independent-operation schedule, on the basis of at least one of the power supply status of the power-generator and the storage battery 200 during the independent operation, the status of the load 300 during the independent operation, or a status of the user during the independent operation.

As described above, the present invention has been described according to the embodiment. However, it must not be understood that the discussions and the drawings constituting a part of this disclosure limit the present invention. From this disclosure, various alternative embodiments, examples and operational techniques are apparent to those skilled in the art.

In the above described embodiment, the configuration where both of the PV 100 and the storage battery 200 are provided in the consumer is described. However, a configuration may be applicable where either one of the PV 100 or the storage battery 200 is provided in the consumer. Also, in addition to the PV 100, or in place of the PV 100, a configuration may be applicable where a gas power-generator or a wind power-generator is provided in the consumer.

In the above described embodiment, the HEMS 700 for performing the power management on a house basis is described as an example. However, in place of the HEMS 700, BEMS may also be performing the power management on a building basis.

Also, at least a part of the configuration of the HEMS 700 shown in FIG. 5 may be provided in the controller 430 of the PCS 400, and at least a part of the processing flow shown in FIG. 6 and FIG. 6 may be performed by the controller 430 of the PCS 400. That is, the PCS 400 may be the control device according to the present invention.

In the flow shown in FIG. 6, the during-independent-operation schedule is determined before switching to the independent operation. However, as shown in FIG. 7, the during-independent-operation schedule may be determined after switching to the independent operation. In the flow shown in FIG. 7, after switching to the independent operation in step S21, various types of information are acquired in step S22, and the during-independent-operation schedule is determined in step S23. The subsequent processing is similar to FIG. 6.

As described above, it must be understood that the present invention includes various embodiments and the like that are not described herein.

Note that the entire content of the Japanese Patent Application No. 2011-092522 (filed on Apr. 18, 2011) is incorporated herein by reference.

INDUSTRIAL APPLICABILITY

As described above, a control device, a power control system, and a power control method according to the present invention is useful in electronics, with which it is possible to appropriately determine an operation schedule of a load during an independent operation.

The invention claimed is:

1. A control device for use in a consumer, the consumer connected to a power system and having a power supply which is operable independently of the power system and at least one load, for controlling the power supply and the at least one load, comprising:
   an operation schedule determination unit that determines a during-independent-operation schedule that is an operation schedule of the at least one load during an independent operation in which the power system does not supply power,
   wherein the operation schedule determination unit determines the during-independent-operation schedule, on the basis of a planned power outage period in which the independent operation is performed, a power supply status of the power supply, and a status of the at least one load.

2. The control device according to claim 1, wherein the operation schedule determination unit determines the during-independent-operation schedule at a start time of the independent operation or during the independent operation.

3. The control device according to claim 2, wherein the operation schedule determination unit determines the during-independent-operation schedule, on the basis of the period when the independent operation is performed, a power supply status of the power supply before determining the during-independent-operation schedule, and a status of the at least one load before determining the during-independent-operation schedule.

4. The control device according to claim 1, further comprising:
   an acquisition unit that acquires a setting of a power supply priority to the at least one load,
   wherein the operation schedule determination unit determines the during-independent-operation schedule further on the basis of the setting.

5. The control device according to claim 1, further comprising:
   a power saving control unit that performs a power saving control for reducing power consumption of each load during the independent operation,
   wherein the operation schedule determination unit determines the during-independent-operation schedule further on the basis of the power saving control.

6. The control device according to claim 1, further comprising:
   a power leveling control unit that performs a power leveling control for leveling out a total power consumption of the at least one load during the independent operation,
   wherein the operation schedule determination unit determines the during-independent-operation schedule further on the basis of the power leveling control.

7. The control device according to claim 1, further comprising:
   an operation schedule change unit that changes at least a part of the determined during-independent-operation schedule, on the basis of at least one of the power supply status of the power supply during the independent operation, the status of the at least one load during the independent operation, or a status of a user during the independent operation.

8. A power control system for use in a consumer, the consumer connected to a power system and having a power supply which is operable independently of the power system and at least one load, and having the control device according to claim 1.

9. The control device according to claim 1, further comprising an operation schedule change unit that changes at least a part of the during-independent-operation schedule during the independent operation on the basis of the power supply status of the power supply during the independent operation and the status of the at least one load during the independent operation.

10. A power control method comprising:
   a determination step of, by a control device, which is provided in a consumer connected to a power system and having a power supply which is operable independently of the power system and at least one load, for controlling the power supply means and the at least one load, determining a during-independent-operation schedule that is an operation schedule of the at least one load during an independent operation in which the power system does not supply power,
   wherein in the determination step, the during-independent-operation schedule is determined, on the basis of a planned power outage period in which the independent operation is performed, a power supply status of the power supply, and a status of the at least one load.

* * * * *